US011597491B2

(12) United States Patent
Guering et al.

(10) Patent No.: US 11,597,491 B2
(45) Date of Patent: Mar. 7, 2023

(54) WALL COVERING PANEL FOR AN AIRCRAFT WITH INTEGRATED INSULATION

(71) Applicant: Airbus Operations SAS, Toulouse (FR)

(72) Inventors: Bernard Guering, Montrabe (FR); Romain Delahaye, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 168 days.

(21) Appl. No.: 16/719,255

(22) Filed: Dec. 18, 2019

(65) Prior Publication Data

US 2020/0198755 A1   Jun. 25, 2020

(30) Foreign Application Priority Data

Dec. 20, 2018  (FR) ...................................... 1873532

(51) Int. Cl.
  *B64C 1/12*  (2006.01)
  *B64C 1/06*  (2006.01)
  *B64C 1/40*  (2006.01)

(52) U.S. Cl.
  CPC ................ *B64C 1/12* (2013.01); *B64C 1/061* (2013.01); *B64C 1/069* (2013.01); *B64C 1/0683* (2020.01); *B64C 1/40* (2013.01)

(58) Field of Classification Search
  CPC ......... B64C 1/12; B64C 1/0683; B64C 1/061; B64C 1/069; B64C 1/40; B64C 1/406;
  (Continued)

(56) References Cited

U.S. PATENT DOCUMENTS

| 3,126,718 A | 3/1964 | Flamand |
| 2005/0044712 A1 | 3/2005 | Gideon et al. |

(Continued)

FOREIGN PATENT DOCUMENTS

| EP | 1510454 A1 | 3/2005 |
| EP | 2730495 A1 | 5/2014 |

(Continued)

OTHER PUBLICATIONS

WO-2018060186 Translation (Year: 2018).*
French Search Report; priority document.

*Primary Examiner* — Assres H Woldemaryam
(74) *Attorney, Agent, or Firm* — Greer, Burns & Crain, Ltd.

(57) ABSTRACT

A wall covering panel for a nose of an aircraft. The panel comprises a rigid carrying framework preferably having an alveolar structure obtained by 3-D printing, a décor carried by the carrying framework and an acoustically and thermally insulating padding fixed to the carrying framework, and also attachments for fixing the carrying framework to the primary structure of the aircraft. Preferably, the panel also integrates systems, such as electrical route portions or ventilation route portions that traverse the panel from one side to the other or lead to an outlet equipment item also integrated in the panel. Only the carrying structure of the panel, which carries the décor, the insulating padding and any route portions and equipment items, is fixed to the primary structure of the aircraft. The number of attachments is low; the kitting-out and the finishing of the nose of the aircraft are greatly simplified.

11 Claims, 6 Drawing Sheets

(58) Field of Classification Search
CPC ........... B64C 1/066; B64C 1/10; H01R 13/73; H01R 2201/26; B64D 2221/00
See application file for complete search history.

(56) References Cited

U.S. PATENT DOCUMENTS

| | | |
|---|---|---|
| 2011/0226377 A1 | 9/2011 | Szarszewski et al. |
| 2012/0234979 A1* | 9/2012 | Smith .................... B61D 17/18 244/158.1 |
| 2014/0134389 A1 | 5/2014 | Humfeldt et al. |
| 2015/0053663 A1* | 2/2015 | Sakota ................... H05B 3/267 219/202 |
| 2016/0368586 A1* | 12/2016 | Weimer .................. B64C 1/066 |
| 2017/0001734 A1* | 1/2017 | Darras ................. B23K 20/122 |
| 2017/0274974 A1 | 9/2017 | Hegenbart et al. |

FOREIGN PATENT DOCUMENTS

| | | | |
|---|---|---|---|
| EP | 3222513 A1 * | 9/2017 | ............. B64C 1/066 |
| EP | 3222513 A1 | 9/2017 | |
| FR | 2918780 A1 | 1/2009 | |
| GB | 2517465 A | 2/2015 | |
| WO | 2018060186 A1 | 4/2018 | |
| WO | WO-2018060186 A1 * | 4/2018 | ............. B64C 1/067 |

\* cited by examiner

Fig.5
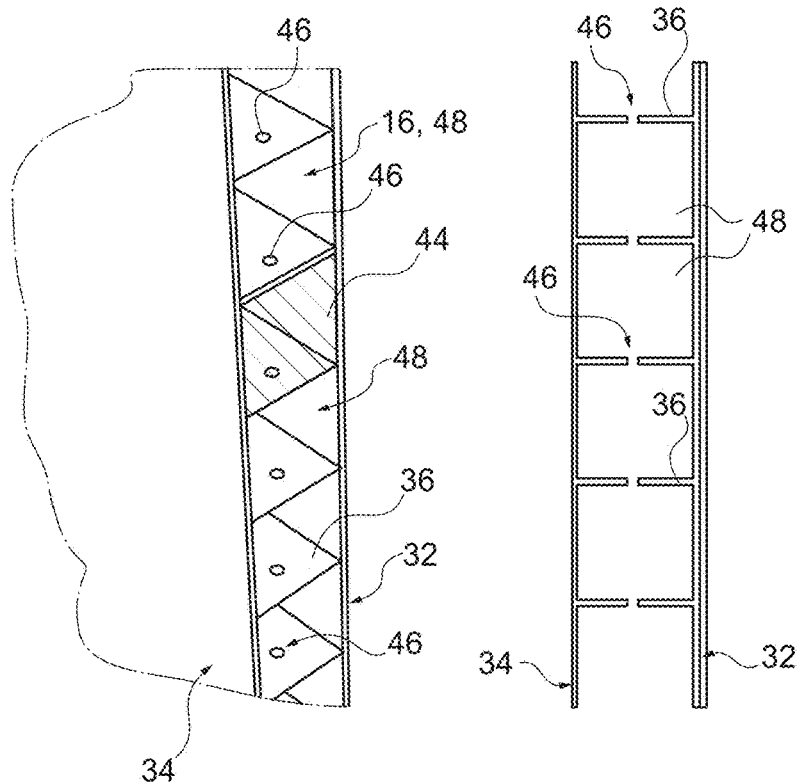
Fig.6
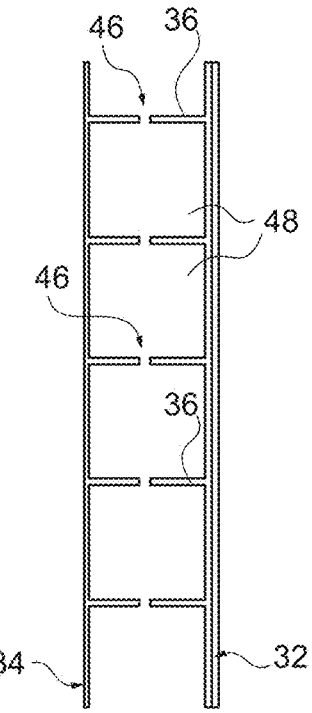
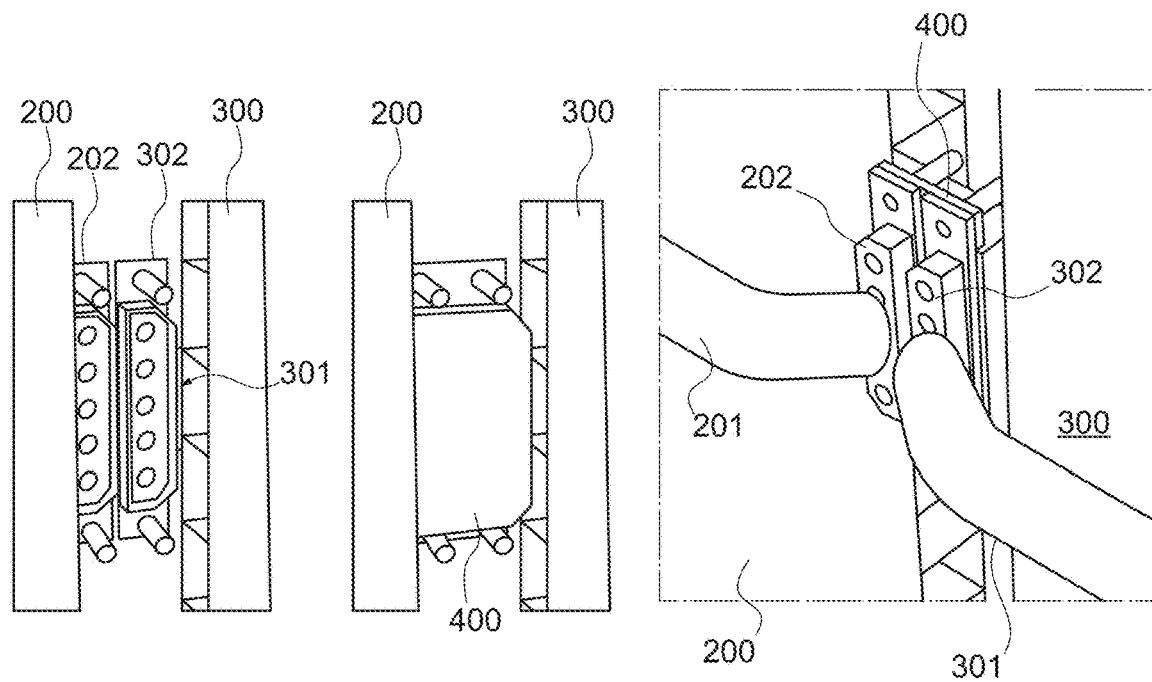
Fig.7    Fig.8    Fig.9

WALL COVERING PANEL FOR AN AIRCRAFT WITH INTEGRATED INSULATION

CROSS-REFERENCES TO RELATED APPLICATIONS

This application claims the benefit of the French patent application No. 1873532 filed on Dec. 20, 2018, the entire disclosures of which are incorporated herein by way of reference.

FIELD OF THE INVENTION

The invention relates to a wall covering panel for an aircraft, particularly adapted to finishing the nose of a passenger-carrying aircraft, notably to the finishing of an upper part of the nose.

BACKGROUND OF THE INVENTION

The nose of a known aircraft contains, from the interior towards the exterior of the aircraft (i.e., in a centrifugal direction):
liner panels, which are henceforth principally produced from composite material (carbon, for example) then decorated by painting or application of a decorative film,
various systems elements, in particular, electrical circuit elements and air circuit elements,
an insulation layer,
the primary structure of the aircraft (including the frames).

The systems elements and the insulation layer are individually and directly fixed to the primary structure of the aircraft using dedicated attachments.

Thus, the kitting-out and the finishing of an aircraft nose require a very high number of components (fixed and movable supports) and installation operations prior to the final placing of the liner panel itself (which is also fixed to the primary structure of the aircraft using dedicated attachments). The kitting-out and the finishing of the nose of the aircraft is a manufacturing aspect that accounts for a great deal of time.

SUMMARY OF THE INVENTION

The invention aims to palliate these drawbacks by proposing a wall covering panel that can be integrated rapidly.

To that end, the invention proposes a wall covering panel for an aircraft, the aircraft having a primary structure. The panel is characterized in that it comprises:
a rigid carrying framework,
a décor carried by the carrying framework,
an acoustically and thermally insulating padding, fixed to the carrying framework,
attachments for fixing the carrying framework of the panel to elements of the primary structure of the aircraft.

The panel according to the invention is further characterized in that:
the carrying framework, the décor and the insulating padding form a self-supporting integral assembly prior to integration thereof into an aircraft,
the carrying framework comprises a cellular plate having a rear face and a front face separated by internal fins, the fins delimiting conduits adapted to constitute fluidic circuit route portions and/or to receive electrical circuit route portions.

Thus, the panel according to the invention integrates, in a single self-supporting integral assembly, both a finishing (decorative) function and an insulation function and it is configured to be able to integrate, without significant modification, electrical and/or fluidic route portions. In the prior art, the finishing and insulation functions are fulfilled by a liner (rigid plate), on the one hand, and by an insulation panel, on the other, these being a liner and insulating panel that it is appropriate to fix one after the other to the primary structure of the aircraft by means of dedicated attachments. With a panel according to the invention, there is no need to fix the insulating padding to the primary structure of the aircraft. The invention thus makes it possible to reduce the number of constituent components of the aircraft, the number of attachments and the number of operations needed for kitting out and finishing the nose and, in particular, the cockpit of the aircraft. This results in a reduction in the mass of the aircraft and a simplification in terms of manufacture, and thus also a reduction in costs.

According to a possible feature of the invention, the wall covering panel further comprises:
at least one fluidic route portion of a fluid circulation circuit, formed by one of the conduits of the cellular plate of the carrying framework of the panel, which fluidic route portion commences at a first edge of the panel,
for each fluidic route portion, a first connection element in the first edge of the panel for the connection of said fluidic route portion to another route portion (upstream route portion) of the same circuit carried by an adjacent panel.

According to a possible feature of the invention, the panel comprises:
at least one electrical route portion, which electrical route portion is housed in one of the conduits of the carrying framework of the panel and commences at a first edge of the panel,
for each electrical route portion, a first connection element in the first edge for the connection of said route portion to an upstream route portion of the same circuit carried by an adjacent panel.

According to a possible feature of the invention, the panel comprises at the same time at least one fluidic route portion and at least one electrical route portion, as defined previously.

According to a possible feature of the invention, at least one of the route portions of the panel (this may be a fluidic or an electrical route portion), extends from the first edge to a second edge of the panel, the route portion then traversing the panel. In all the following text, such a route portion is called a through-portion. The wall covering panel then comprises, advantageously, a second connection element in the second edge for the connection of the route through-portion to another route portion (downstream route portion) of the same circuit, carried by an adjacent panel.

In a variant, the wall covering panel integrates at least one (electrical or fluidic) outlet equipment item and one of the (electrical or fluidic) route portions extends from the first edge to the outlet equipment item, the circuit then terminating in the panel via this route portion and this outlet equipment item. In all the following text, such a route portion is called a terminal portion. An outlet equipment item is, for example, a ventilation outlet, lighting, a box for storing diverse hardware, etc.

Naturally, a wall covering panel according to the invention may comprise a first, route through-portion and a second, route terminal portion, or a plurality of route through-portions and a plurality of route terminal portions, terminating in diverse outlet equipment items integrated in the panel.

According to a possible feature of the invention, the rear face and front face of the cellular plate are single, smooth walls. If necessary, such a cellular plate with smooth faces is supplemented by mechanical reinforcement ribs provided on the rear face thereof.

Preferably, the internal fins of the cellular plate are pierced with drainage holes allowing communication between neighboring cells such as to prevent complete sealing of the conduits formed by the internal fins, which could be problematic when considering variations in pressure in the cockpit during different flight phases; also, and above all, these holes allow drainage of condensation water towards the bottom of the plate.

The cellular plate of the panel according to the invention is advantageously obtained by 3-D printing. When they are provided, the mechanical reinforcement ribs are obtained by means of the same method during the same step of manufacture of the cellular plate.

Another advantage of the invention is that the alveolar structure of the cellular plate of the carrying framework (preferably with mechanical reinforcement ribs), makes it possible, owing to its high level of stiffness and its very high flexural inertia, to limit the points where it is fixed to the primary structure of the aircraft. Four attachment points distributed at the four corners of the cellular plate (considering a panel of overall rectangular form, be this planar or curved) suffice in the majority of cases. Considerable gains in terms of mass, time and costs of manufacture are thus achieved.

According to a possible feature of the invention, the conduits of the cellular plate not used as fluidic route portion or as conduit for receiving an electrical route portion are closed by caps at the edges of the carrying framework.

According to a possible feature of the invention, the acoustically and/or thermally insulating padding is a block of rigid foam. Such a block is stable in terms of dimensions and clearances relative to any outlet equipment fixed to the rear face of the carrying framework, such that any risk of wear by friction (fretting) is avoided. The volume of the foam block advantageously takes account of the thermal and acoustic insulation capacity of the carrying framework.

Preferably, the block of rigid foam is provided at its periphery with a band of flexible foam that makes it possible to guarantee the join with the direct environment of the wall covering panel and to form a joint between the insulating padding of two adjacent panels.

The invention extends to an aircraft having a nose equipped with wall covering panels according to the invention.

According to a possible feature of the aircraft, it comprises junction bands provided with a supplementary insulation between adjacent panels.

According to a possible feature of the aircraft, each electrical route portion has, at its end, a connection socket arranged on the edge of the carrying framework of the panel such that when the panels are set in place the two connections are placed against one another (side by side or one above the other, as explained below) such as to connect the two route portions by using a junction connector that caps the connection sockets.

BRIEF DESCRIPTION OF THE DRAWINGS

Other details and advantages of the present invention will become apparent upon reading the following description that makes reference to the appended schematic drawings and relates to preferred embodiments that are provided by way of non-limiting examples.

FIG. 5 is a perspective schematic view of a portion of the cellular plate of the carrying framework of a wall covering panel according to the invention.

FIG. 6 is a schematic view in cross section of the carrying framework of FIG. 5.

FIGS. 7 to 9 are perspective schematic views of electrical connection elements at the junction between two adjacent panels.

DETAILED DESCRIPTION OF THE PREFERRED EMBODIMENTS

Figure 1:
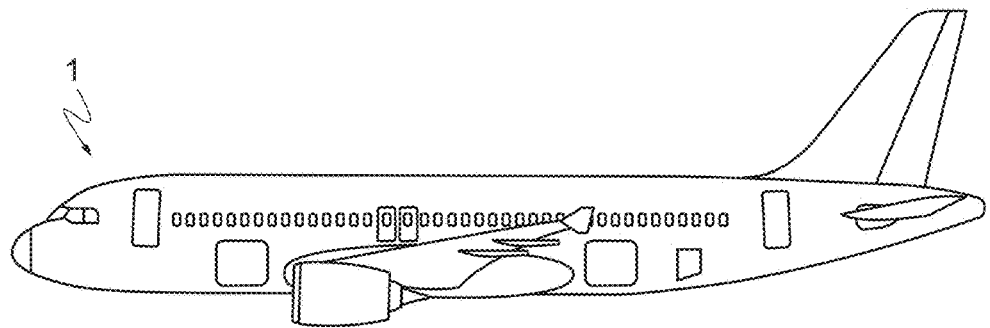
FIG. 1 is a schematic profile view of an aircraft in which the invention may be implemented.
Figure 2:
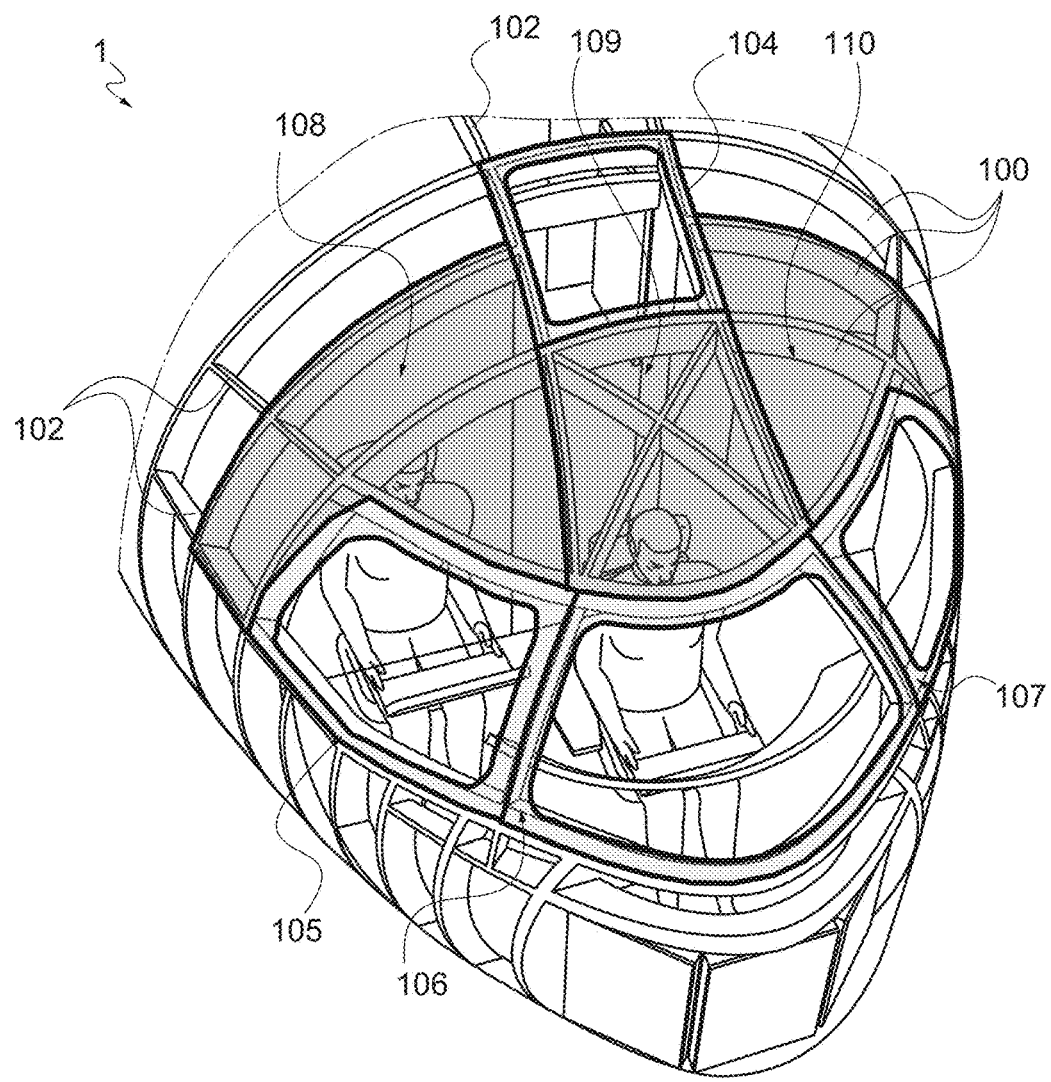
FIG. 2 is a ¾ top perspective schematic view of the nose of an aircraft such as that of FIG. 1.

The wall covering panels illustrated in the appended figures are particularly suited to the liner of the nose 1 of an aircraft such as that illustrated in FIG. 1. FIG. 2 shows the primary structure of a nose that comprises, notably, frames 100 and longitudinal members 102. Also picked out in this FIG. 2 are wall covering panels 104 to 110 of various forms. These panels are arranged inside the shell formed by the primary structure and the skin (removed, in this case) of the aircraft. They are shown in grey hues as being practically transparent such as schematically to show the interior of the cockpit.

Figure 3:
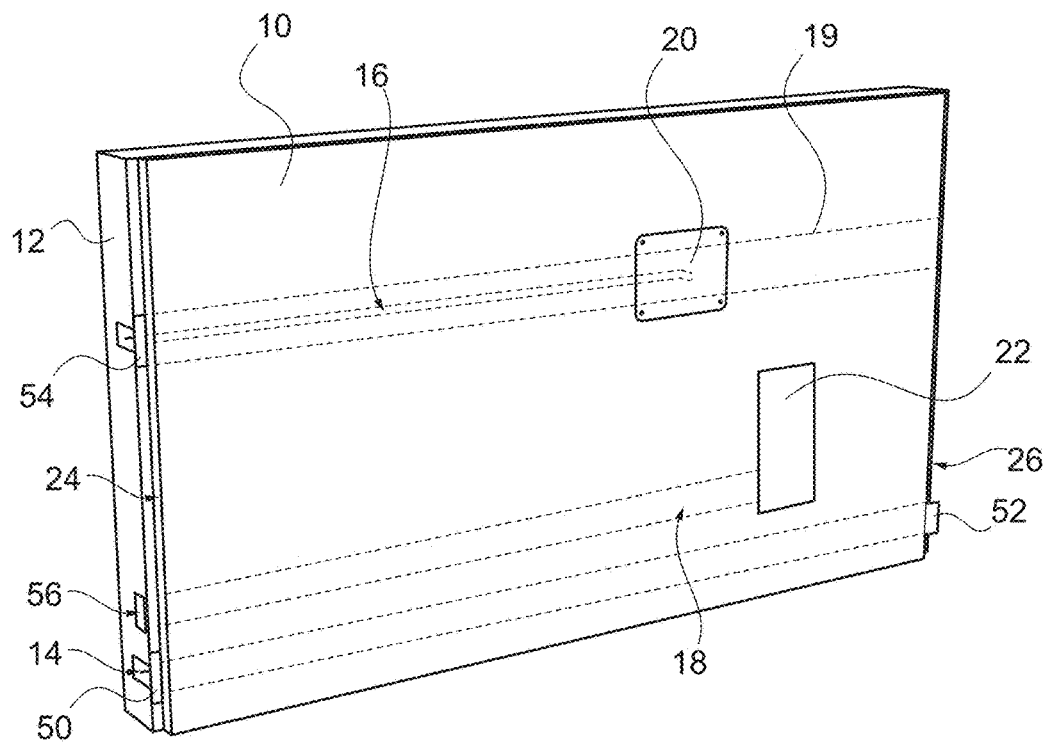
FIG. 3 is a ¾ front perspective schematic view of a wall covering panel according to the invention.
Figure 4:
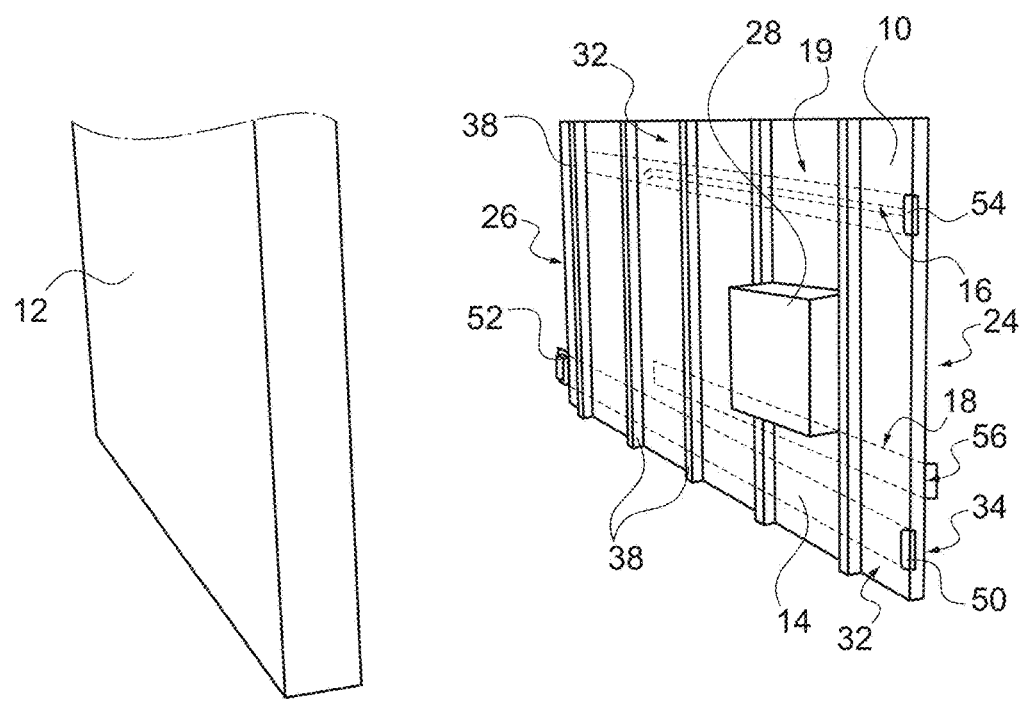
FIG. 4 is a ¾ rear perspective expanded schematic view of the wall covering panel of FIG. 3.
Figure 10:
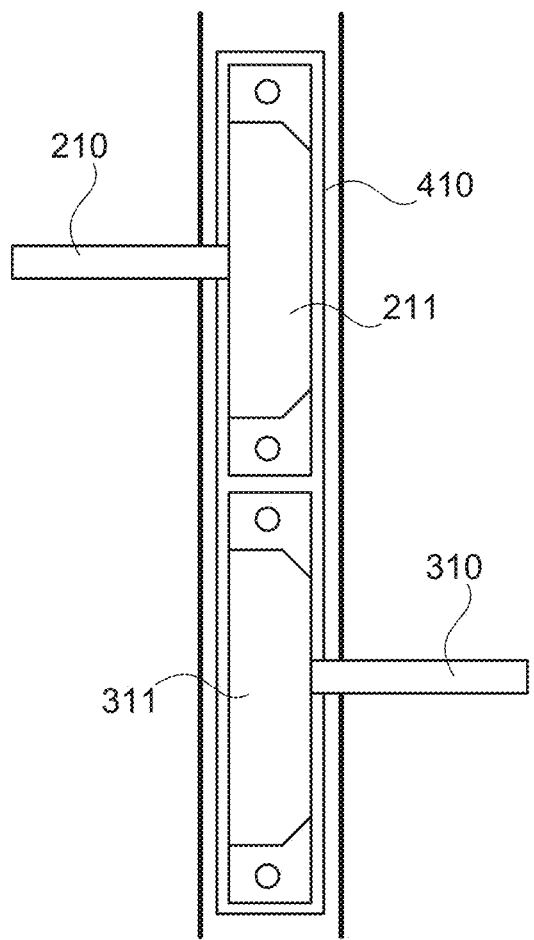
FIG. 10 is a front schematic view of a variant of electrical connection elements at the junction between two adjacent panels.
Figure 11:
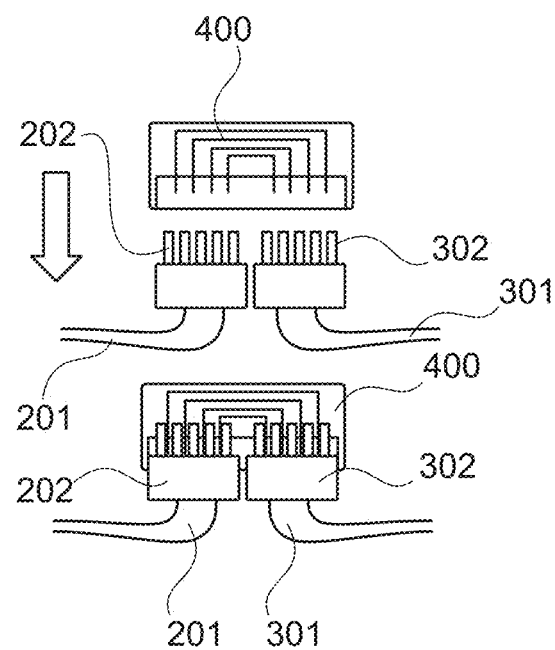
FIG. 11 is a sectional view of electrical connection elements illustrated in FIGS. 7 to 9.

A wall covering panel according to the invention comprises a carrying framework 10 and an insulating padding 12 (see FIGS. 3 and 4). The carrying framework 10 comprises a cellular plate having a smooth front face 34 and a smooth rear face 32 between which fins 36 extend (see, also, FIGS. 5 and 6). The front face receives a décor, which may be a raised motif obtained directly by 3-D printing at the time of the manufacture of the carrying framework, or which may be a textured adhesive film attached to the framework after its manufacture; a finishing paint may be provided in order to finish the décor. The cellular plate is reinforced by ribs 38 on the rear face 32 thereof (see FIG. 4). The fins 36 are pierced with holes 46 for drainage of condensation water.

The wall covering panel illustrated in FIGS. 3 and 4 further comprises an electrical route through-portion (cable not shown) housed in a conduit 14 of the cellular plate, that extends from a first vertical edge 24 of the panel to the opposite vertical edge 26. It should be noted that the terms "vertical," "horizontal," etc., make reference to the orientation of the panel as illustrated in the figures, which is not necessarily the orientation thereof when installed in the nose of the aircraft.

The panel illustrated in FIGS. 3 and 4 also comprises an electrical route terminal portion 16 (i.e., a non-through portion), which commences at the first edge 24 and ends at an outlet equipment item integrated in the carrying framework 10, in this case a lighting device 20. This electrical route portion is constituted by an electric cable 16 housed in a conduit 19 of the cellular panel. Although the route portion is a terminal portion, the conduit 19 receiving it may be a through-conduit, i.e., it may extend from the edge 24 to the opposite edge 26 (as illustrated); in a variant, it may stop at the lighting device 20.

The panel illustrated in FIGS. 3 and 4 further comprises a ventilation route terminal portion 18 (a non-through portion) that likewise commences at the first edge 24 and ends in a ventilation outlet 22 (outlet equipment item). This ventilation route terminal portion 18 is formed actually inside the carrying framework 10 by a conduit delimited by two successive horizontal internal fins 36 of the carrying framework.

The internal fins of the cellular plate may thus delimit horizontal conduits, but also vertical conduits (not shown), a multitude of geometries being possible on the proviso that the mechanical strength of the carrying framework and of the wall covering panel is not undermined. The conduits of the cellular plate not used as ventilation route portion (or as any other fluid circulation portion) and which do not receive an electrical route portion are closed by covers 44 at the edges of the carrying framework (a single cap is shown in FIG. 5 such that it is possible to view the internal fins 36 of the cellular plate). Although the carrying framework is obtained by 3-D printing, current 3-D printing technology, as it stands, means that it is simpler to attach closure caps 44 (to facilitate the removal of printing waste). If technological evolution so permits, in the future these may advantageously directly form part of the main component, i.e., be printed at the same time as the rest of the carrying framework.

If necessary, in addition to the route portions housed or directly formed in the carrying framework of the panel, it is also possible to make provision for ventilation route portions or electrical route portions formed by hoses or cables attached to the rear face 32 of the carrying framework. In this case, indentations should be provided in the insulating padding, in which said route portions (hoses or cables) will be housed.

The wall covering panel illustrated in FIG. 4 also comprises a storage box 28 against the rear face 32 of its carrying framework 10. A flap (not shown) may be provided on the front face 34 of the carrying framework to provide access to the interior of this casing.

For each route portion, connection elements are provided at the border of the wall covering panel for the connection of the route portion to an upstream route portion carried by an adjacent panel and, as appropriate, to any downstream route portion carried by another adjacent panel.

Thus, for example, the electrical route through-portion 14 comprises an upstream electrical connection socket 50 at the first edge 24 of the carrying framework and a downstream electrical connection socket 52 at the second edge 26 of the carrying framework; the electrical route terminal portion 16 comprises an upstream electrical connection socket 54 (very schematically embodied in FIGS. 3 and 4) at the first edge 24 (in the case of a route terminal portion, there is no downstream connection element); the ventilation route terminal portion 18 comprises an upstream connector 56 at the first edge 24 (no downstream connector at the edge 26 since it is a route terminal portion).

FIGS. 7 to 11 illustrate electrical connection elements between two adjacent panels. For the sake of clarity, the insulating padding of these two panels is not shown; only the carrying frameworks 200 and 300 and the electrical route portions 201 and 301 to be connected feature. Each electrical route portion 201, 301 has, at its end, a connection socket 202, 302 arranged on the edge of the carrying framework of the corresponding wall covering panel. When the panels are set in place, the two connection sockets 202, 302 are placed side-by-side, as illustrated in FIG. 7. In order to connect the two route portions 201, 301, use is made of a junction connector 400 (see FIG. 8) that caps the connection sockets 202, 302. When fitted on the two connection sockets, the junction connector 400 ensures electrical continuity between the two connection sockets 202, 302, as may be seen in FIG. 11 (bottom part of the figure). It should be noted that the connection sockets 202, 302 and the junction connector 400 are "connection elements" within the meaning of the appended claims.

In the example just described, the two connection sockets are arranged side-by-side. In a variant (see FIG. 10), it is possible to make provision for electrical route portions 210, 310 to be connected, which are offset in terms of height such that their connection sockets 211, 311 are one above the other (i.e., one following the other in a direction along the edge of the panel) when the adjacent panels are set in place. An elongate junction connector 410 that covers the two connection sockets over their entire height thus has to be used. This arrangement makes it possible to limit the separation between the carrying frameworks of the two adjacent panels and to limit the amplitude, and to facilitate the treatment of the thermal bridges that appear at the junction between the wall covering panels.

Figure 12:
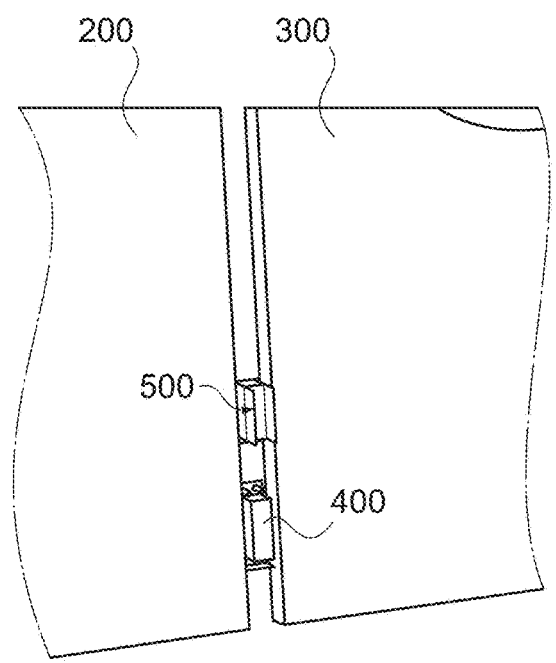
FIG. 12 is a ¾ front perspective view of the junction between two adjacent panels with electrical connection elements and connection elements of a ventilation circuit.
Figure 13:
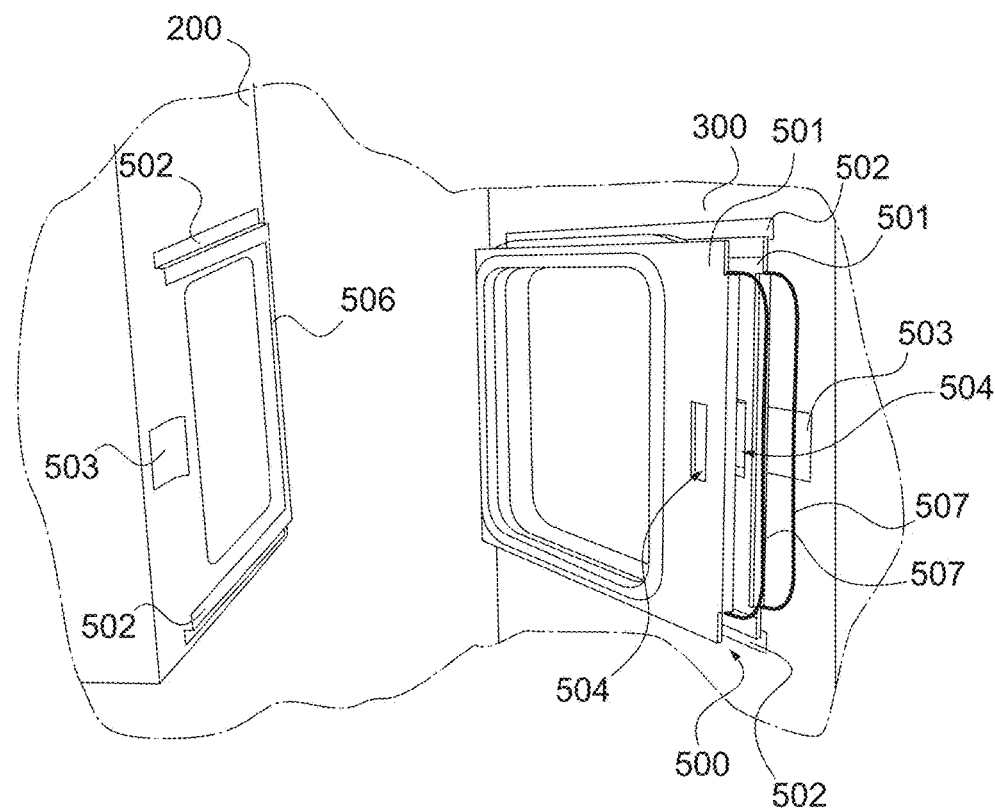
FIG. 13 is a perspective schematic view of connection elements of a ventilation circuit.

FIGS. 12 and 13 illustrate ventilation connection elements between two adjacent panels. For the sake of clarity, here, once again, the insulating padding of these two panels is not shown. FIG. 12 shows both the above-described electrical connection elements, including the link connector 400, and a ventilation connector 500 inserted between the edge face of the carrying framework 300 of a panel integrating an upstream ventilation route portion and the edge face of the carrying framework 200 of a panel integrating a downstream ventilation route portion. As explained previously, according to the invention the ventilation circuit is formed by conduits delimited by the internal fins of the carrying frameworks of the wall covering panels.

At the edge of each panel, the end of the conduit forming a ventilation route portion is provided with a frame on the edge face of the carrying framework. This frame carries two parallel slides 502 (see FIG. 13) and an elastically deformable flexible locking tongue 503, one end of which is fixed to the frame and the other end of which is free. The slides 502 and the locking tongue 503 constitute connection elements within the meaning of the appended claims. These connection elements further comprise a connector 500 comprising two end plates 501 between which a compressible flexible tube 502 extends. Each end plate is configured such as to be able to be inserted in the slides 502 of one of the panels.

To guarantee the proper positioning of the connector 500, a stop slide 506 and a locking system (including the locking tongue 503) are provided: each end plate 501 abuts in the stop slide 506 when the connector 500 is slid as far as the end in the slides 502; furthermore, each end plate 501 is provided with a slot 504 designed to receive the free end of the locking tongue 503 when the connector 500 is in the locking position (fully inserted in the slides 502 and 506). To make it easier to handle the connector 500 and to set it in place, thin handles 507 may be provided.

Figure 14:
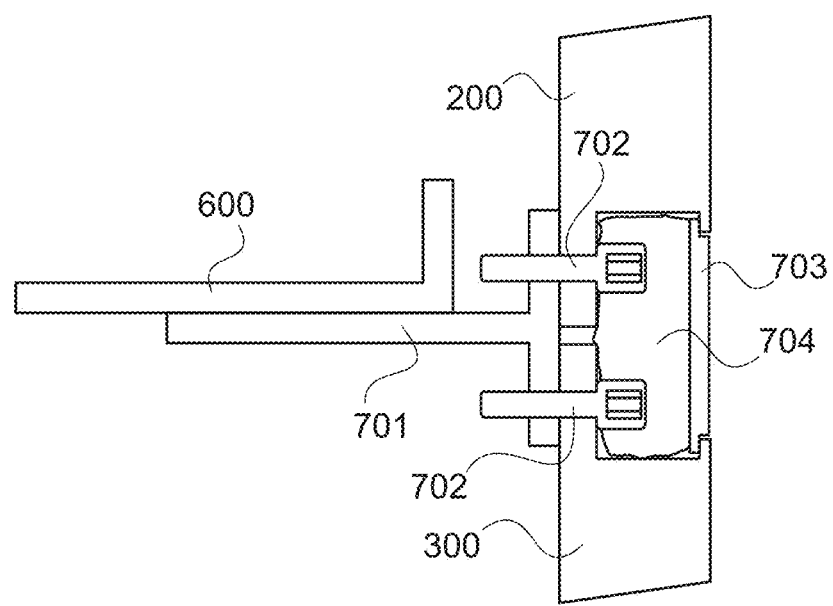
FIG. 14 is a schematic view in cross section of two adjacent panels at an attachment of said panels.

The installation of the wall covering panels according to the invention is extremely simple and rapid. Each panel is presented in front of its definitive location and the carrying framework of the panel is fixed to the primary structure of the aircraft at a limited number of attachment points, using attachments such as that illustrated in FIG. 14 (in this figure, once again, the insulating padding of the panels is not shown).

By way of example, each of the four corners of the panel according to the invention may be fixed to a frame 600 of the primary structure using a mount 701 and a fixing screw 702. In the example illustrated, the mount 701 is used to fix two adjacent panels 200, 300. It in effect comprises a web fixed to the frame 600 and two flanges each receiving a fixing screw 702, one of the screws serving to fix a first panel 200 and the other screw serving to fix the second panel 300.

A decorative junction band 703 provides a decorative finish between the two panels. To ensure the continuity of the thermal and acoustic insulation between the two adjacent panels and thereby to limit the thermal bridges between the structure and the cockpit, two solutions may be provided. As may be seen in FIG. 3, the insulating padding 12 of each panel may advantageously extend beyond the carrying framework 10 such as to fill in the residual space between the carrying frameworks of the adjacent panels (this residual space results from the presence of the electrical junction connectors 400 and/or ventilation connectors 500 between panels). The projecting portion of insulation is preferably flexible and compressible (the rest of the insulating padding 12 preferably being rigid), such as to make it easier to set the panels and junction or other connectors in place and to guarantee the continuity of the insulation). In a variant, or in combination, a complementary insulation band 704 is inserted behind the decorative junction band 703.

The invention extends to any variant accessible to a person skilled in the art, i.e., covered within the scope delimited by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wall covering panel for an aircraft, the aircraft having a primary structure, comprising:
   a rigid carrying framework,
   a décor carried by the carrying framework,
   an acoustically and thermally insulating padding, fixed to the carrying framework,
   attachments for fixing the carrying framework of the panel to elements of the primary structure of the aircraft,
   the carrying framework, the décor and the insulating padding forming a self-supporting integral assembly prior to integration thereof into an aircraft, the carrying framework comprising a cellular plate having a rear face and a front face separated by internal fins, the fins extending from the rear face to the front face of the cellular plate, the fins, the rear face, and the front face of the cellular plate forming conduits adapted to constitute fluidic circuit route portions and the fins, the rear face and the front face of the cellular plate forming conduits adapted to receive electrical circuit route portions,
   at least one fluidic route portion of a fluid circulation circuit, formed by one of the conduits of the cellular plate, extending from a first edge to a second edge of the panel and traversing the panel from the first edge to the second edge of the panel,
   a first connection element in the first edge of the panel for a connection of the at least one fluidic route portion to an upstream route portion of the fluid circulation circuit carried by an adjacent panel,
   a second connection element in the second edge of the panel for a connection of the at least one fluidic route portion to a downstream route portion of the fluid circulation circuit carried by an adjacent panel,
   at least one electrical route portion of an electrical circuit, housed in one of the conduits of the cellular plate and traversing the panel from the first edge to the second edge of the panel,
   a first connection element in the first edge of the panel for a connection of the at least one electrical route portion to an upstream route portion of the electrical circuit carried by an adjacent panel,
   a second connection element in the second edge of the panel for a connection of the at least one electrical route portion to a downstream route portion of the electrical circuit carried by an adjacent panel.

2. The wall covering panel according to claim 1, wherein the panel integrates at least one outlet equipment item and one of the route portions extends from the first edge to the outlet equipment item, the circuit then terminating in the panel via this route portion and this outlet equipment item.

3. The wall covering panel according to claim 1, wherein the internal fins are pierced with drainage holes allowing communication between neighboring cells of the cellular plate.

4. The wall covering panel according to claim 1, wherein the carrying framework comprises mechanical reinforcement ribs on the rear face of the cellular plate.

5. The wall covering panel according to claim 1, wherein the cellular plate is obtained by 3-D printing.

6. The wall covering panel according to claim 1, wherein the conduits of the cellular plate not used as the fluidic route portion or as the conduit for receiving an electrical route portion are closed by caps at edges of the carrying framework.

7. The wall covering panel according to claim 1, wherein the insulating padding is a block of rigid foam, equipped on its periphery with a band of flexible foam forming a joint.

8. An aircraft comprising a nose equipped with a plurality of panels according to claim 1.

9. The aircraft according to claim 8, wherein the carrying framework of each panel is fixed to the primary structure of the aircraft at four attachment points distributed at four corners of the panel.

10. The aircraft according to claim 8, further comprising junction bands provided with a supplementary insulation between adjacent panels.

11. The aircraft according to claim 8, wherein each electrical route portion has, at an end thereof, a connection socket arranged on an edge of the carrying framework of the panel such that when the panels are set in place, two connections are placed against one another such as to connect the two route portions by using a junction connector that caps the connection sockets.

* * * * *